(12) United States Patent
Zhang et al.

(10) Patent No.: US 7,895,929 B2
(45) Date of Patent: Mar. 1, 2011

(54) BLADE DRIVING MECHANISM FOR A TABLE SAW

(75) Inventors: Yongsheng Zhang, Qingdao (CN); Zaiming Yan, Qingdao (CN)

(73) Assignee: Qingao D&D Electro Mechanical Technologies Co., Ltd., Qingdao (CN)

( * ) Notice: Subject to any disclaimer, the term of this patent is extended or adjusted under 35 U.S.C. 154(b) by 911 days.

(21) Appl. No.: 11/358,822

(22) Filed: Feb. 21, 2006

(65) Prior Publication Data

US 2006/0191393 A1    Aug. 31, 2006

(30) Foreign Application Priority Data

Feb. 25, 2005   (CN) .......................... 2005 2 0080558

(51) Int. Cl.
*B27B 5/24*     (2006.01)
*B26D 1/15*     (2006.01)
*B26D 5/02*     (2006.01)

(52) U.S. Cl. .......... 83/477.1; 83/477.2; 474/58; 474/114

(58) Field of Classification Search ................. 83/477.2, 83/477, 477.1, 563, 564; 409/204–206; 474/58, 474/113–115

See application file for complete search history.

(56) References Cited

U.S. PATENT DOCUMENTS

| | | | | |
|---|---|---|---|---|
| 1,616,191 | A | * | 2/1927 | Lipman .......................... 474/114 |
| 1,976,130 | A | * | 10/1934 | Kearns et al. .................. 451/294 |
| 2,008,673 | A | * | 7/1935 | Ocenasek ........................ 83/473 |
| 2,421,459 | A | * | 6/1947 | Marsilius ....................... 409/206 |
| 2,661,777 | A | * | 12/1953 | Hitchcock ........................ 83/473 |
| 2,690,084 | A | * | 9/1954 | Van Dam ......................... 474/58 |
| 2,704,463 | A | * | 3/1955 | Hess ............................... 474/58 |
| 2,758,615 | A | * | 8/1956 | Mastriforte ..................... 83/473 |
| 2,804,890 | A | * | 9/1957 | Fink .............................. 83/477.1 |
| 3,368,596 | A | * | 2/1968 | Comer ............................ 83/473 |
| 4,077,161 | A | * | 3/1978 | Wyle et al. ..................... 451/231 |
| 4,184,394 | A | * | 1/1980 | Gjerde .......................... 83/477.1 |
| 4,201,254 | A | * | 5/1980 | Fehric ............................ 144/1.1 |
| 5,277,665 | A | * | 1/1994 | Paulson ........................ 474/114 |

* cited by examiner

*Primary Examiner* — Clark F. Dexter
(74) *Attorney, Agent, or Firm* — Connolly Bove Lodge & Hutz LLP

(57) ABSTRACT

A blade driving mechanism for a table saw, wherein the table saw comprises a main frame and a saw blade mounted to an driven by the blade driving mechanism, and the blade driving mechanism comprises an electrical motor mounted to the main frame, with the motor being capable of sliding with respect to the main frame; a belt driving system for transferring the rotation of an output shaft of the motor to the saw blade; a center-distance setting device connected between the motor and the saw blade, for adjustably setting the center-to-center distance between the motor and the saw blade; and a saw-blade height adjusting device being operable to adjust the height of the saw blade.

9 Claims, 3 Drawing Sheets

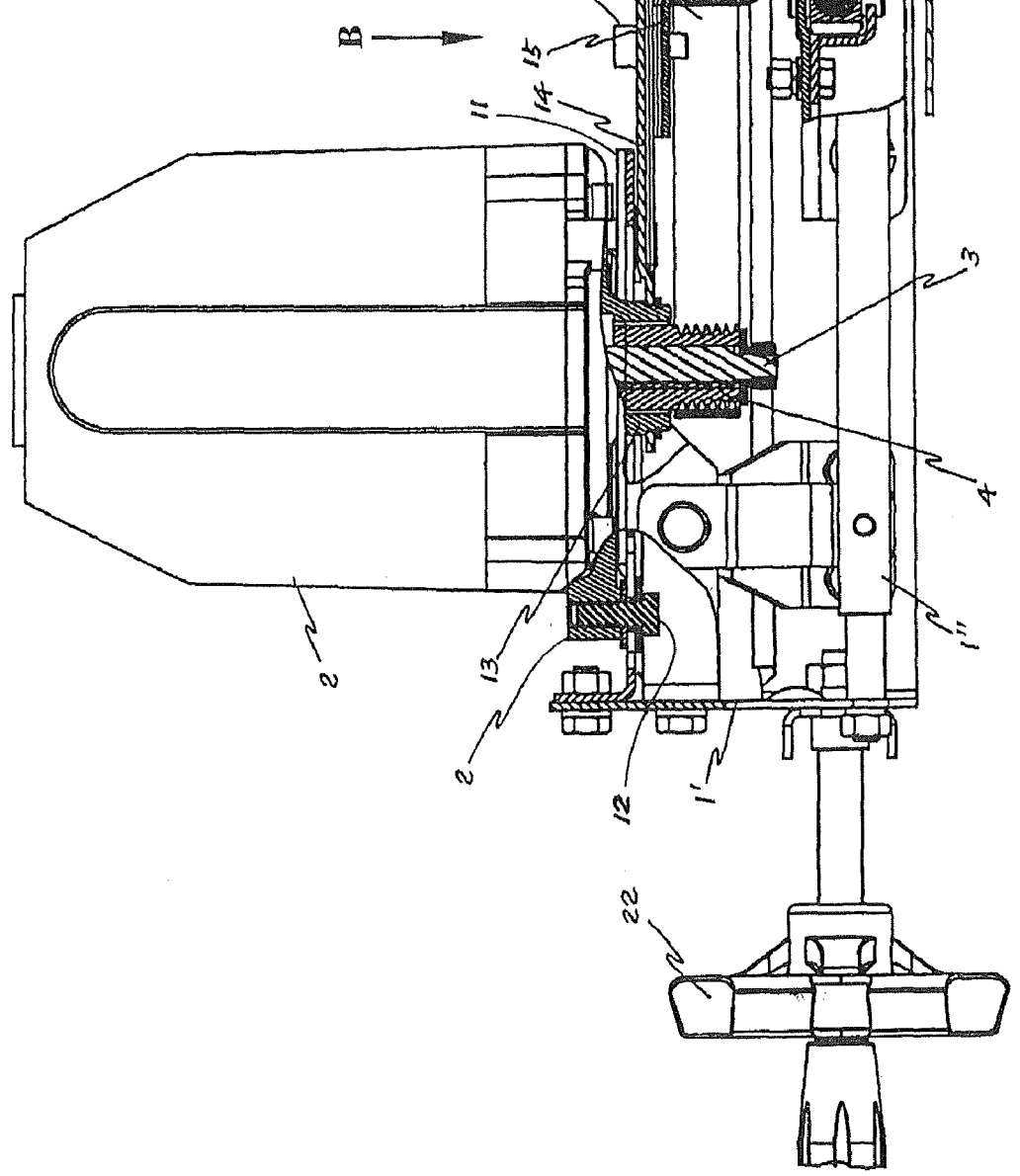

BLADE DRIVING MECHANISM FOR A TABLE SAW

FIELD OF THE INVENTION

The present invention relates to a woodworking machine, especially to an improvement to the blade driving mechanism for a table saw, which is capable of adjusting the height of the saw blade.

BACKGROUND OF THE INVENTION

Traditional saw-blade height adjusting devices for woodworking table saws generally have complex structures, and are generally difficult to operate which results in excessive labor and time consumption. Users of the traditional table saws face a lot of inconveniences, including that the height of the saw blade cannot be adjusted easily and promptly when desired, or in other words, it is difficult to adjust the cutting-in depth of the workpiece. Difficulty in adjusting the height of the saw blade also results in a low output of the table saw. Meanwhile, for their complex structures, the manufacturing cost of the table saws is also high.

SUMMARY OF THE INVENTION

An object of the present invention is to overcome the above shortcomings by providing an improved blade driving mechanism for a table saw, which is capable of adjusting the height of the saw blade. The height of the saw blade, or the cutting-in depth of the workpiece, can be adjusted easily and promptly when desired. The driving mechanism has a simple structure, is convenient to adjust and operate, and has a low manufacturing cost and a high output.

In order to achieve this object, the present invention provides a blade driving mechanism for a table saw, wherein the table saw comprises a main frame and a saw blade mounted to and driven by the blade driving mechanism, and the blade driving mechanism comprises an electrical motor mounted to the main frame, with the motor being capable of sliding with respect to the main frame; a belt driving system for transferring the rotation of an output shaft of the motor to the saw blade; a center-distance setting means connected between the motor and the saw blade, for adjustably setting the center-to-center distance between the motor and the saw blade; and a saw-blade height adjusting device being operable to adjust the height of the saw blade. The saw-blade height adjusting device comprises a transverse shaft being capable of rotating about a horizontal axis; a handwheel fixed to the outer end of the transverse shaft for driving the transverse shaft to rotate; a vertical screw shaft coupled with the transverse shaft by a set of bevel gears and driven by the transverse shaft to rotate about a vertical axis; a nut mounted on and engaged with the screw shaft and being capable of moving along the screw shaft by the rotation of the screw shaft; and a guide connected to the nut and supporting the saw blade.

Preferably, the belt driving system comprises a driving pulley fastened to an output shaft of the motor, a driven pulley connected to the saw blade for driving the saw blade to rotate, and a belt wound around the driving pulley and the driven pulley.

Preferably, the center-distance setting means comprises a motor connecting plate and a blade connecting plate, wherein the motor connecting plate is pivotably mounted onto a shaft sleeve of the motor at one end and is formed with at least two oblong holes at the other end, the end of the blade connecting plate which is proximate to the motor connecting plate is formed with screw holes corresponding to the oblong holes, the other end of the blade connecting plate is pivotably mounted onto a blade supporting member which is fixed to the guide and supports the saw blade, and setting screws inserted through the oblong holes and tightly screwed into the screw holes of the blade connecting plate, so as to fix the motor connecting plate and the blade connecting plate together.

Preferably, the driven pulley is connected to the saw blade by a blade supporting shaft, which is rotatably supported by the blade supporting member via bearings.

Preferably, the electrical motor is mounted to the main frame via a motor mounting plate which is fastened to the main frame, a motor mount of the motor is mounted to the motor mounting plate via at least two motor mounting screws which are inserted through oblong holes formed in the motor mounting plate and are screwed into corresponding screw holes formed in the motor mount, and the motor mounting screws, after they are screwed into the motor mount, allow the motor mount and therefore the motor to slide along the extending direction of the oblong holes freely or by overcoming a certain low resistance force.

Preferably, the motor mounting screws are movable connecting screws.

Preferably, the belt is composed of a plurality of V-type belts, and the driving pulley and the driven pulley are V-groove pulleys.

Preferably, the transverse shaft is rotatably supported by a left holding plate and a right holding plate, and the left holding plate and the right holding plate are attached to and integrated with the main frame to form a unit.

Preferably, the guide is formed with guiding holes, and vertical guiding rods, which are fixed to the main frame, extend through the guiding holes for guiding the guide ascending or descending.

Preferably, each of the guiding holes is provided with a guide sleeve.

By using the blade driving mechanism of the invention, the height of the saw blade, or the cutting-in depth of the workpiece, can be adjusted easily and promptly when desired. The driving mechanism has a simple structure, is convenient to adjust and operate, and has a low manufacturing cost and a high output. The blade driving mechanism of the invention may be used in various table saws.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a partially cut-away sectional view taken along the line A-A in FIG. 1;

FIG. 3 is a partial view taken along the arrow B in FIG. 2; and

DETAILED DESCRIPTION OF THE PREFERRED EMBODIMENT

An embodiment of a table saw according to the present invention will now be described with reference to the figures, wherein like numbers represent like parts.

Figure 1:
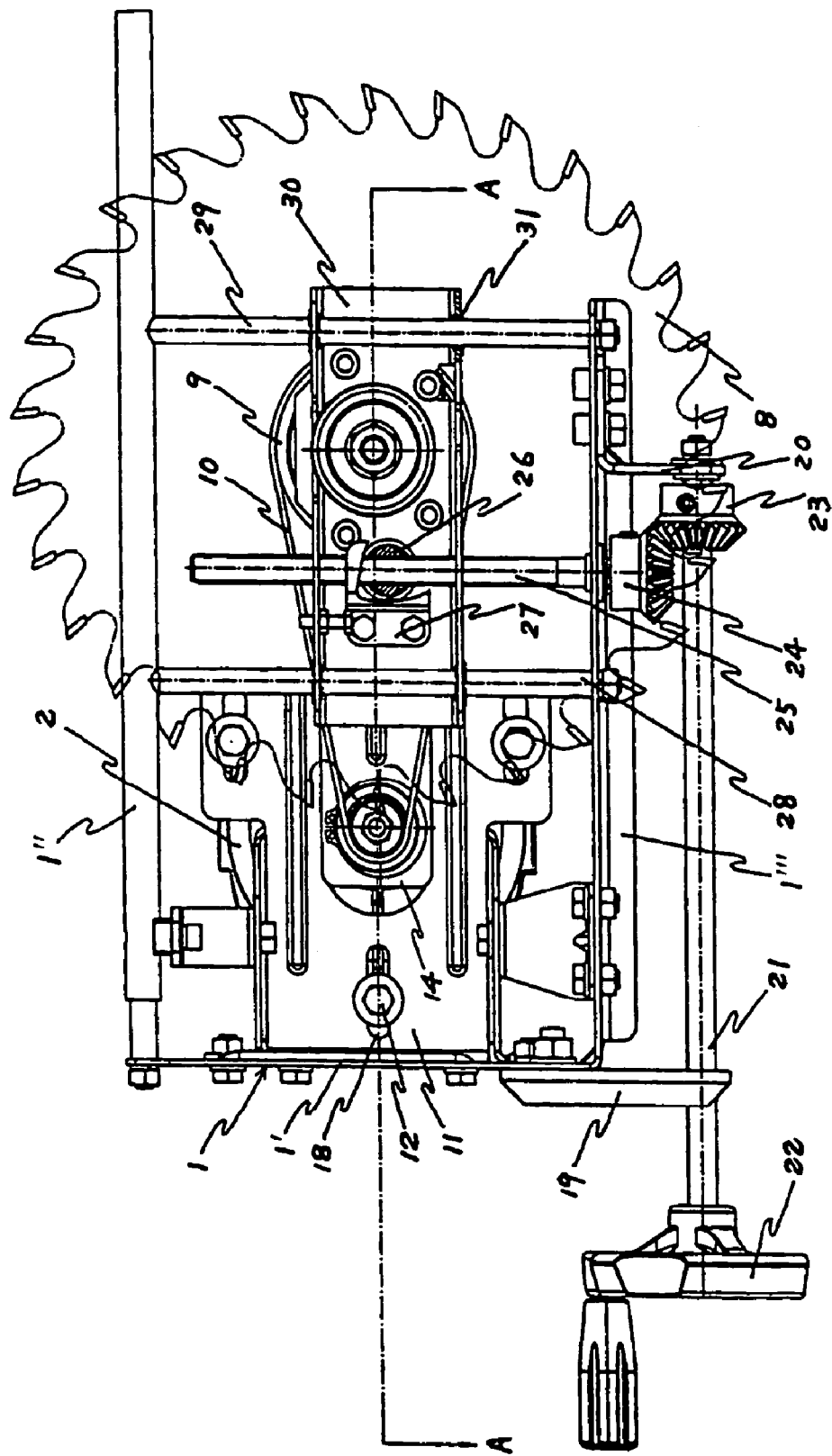
FIG. 1 is a diagrammatic front view of a table saw according to the present invention.
Figure 4:
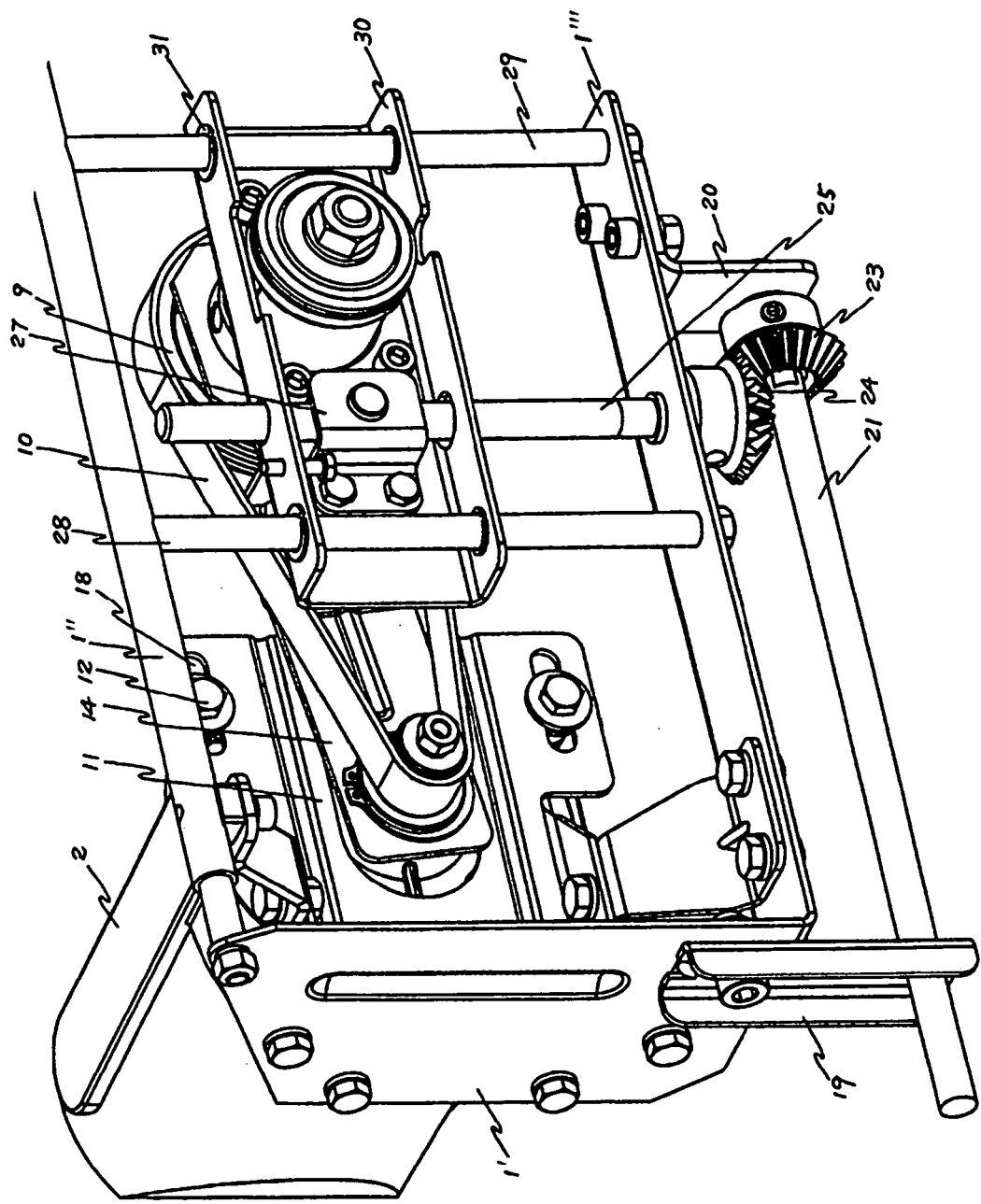
FIG. 4 is partially cut-away perspective view of the table saw according to the present invention.

As shown in FIGS. 1 to 4, a table saw of the present invention comprises a main frame 1, a working table (not shown) mounted onto the main frame, a blade driving mechanism mounted to the main frame, and a saw blade 8 mounted to and driven by the blade driving mechanism.

The main frame 1 is composed of several frame parts, such as a vertical plate part 1', a horizontal bar 1" mounted to the top end of the vertical plate part 1', and a horizontal plate part 1'" mounted to or integrally formed with the vertical plate part 1' at the lower end of the vertical plate part 1'. All the frame parts are used for mounting and supporting various parts of the blade driving mechanism.

The saw blade 8 is driven by the blade driving mechanism to rotate. The height of the saw blade 8, or the height of the part of the saw blade 8 which comes out from the working table, can be adjusted by the blade driving mechanism.

The blade driving mechanism comprises an electrical motor 2 mounted to the main frame 1 (specifically, mounted to the vertical plate part 1') via a motor mounting plate 11, a driving pulley 4 fastened to an output shaft 3 of the motor 2, a generally cylindrical shaped blade supporting member 5, the mounting manner of which will be described later in detail, for supporting the saw blade, a blade supporting shaft 7 rotatably mounted in the blade supporting member 5 by bearings 6, with the saw blade 8 fastened to one end of the blade supporting shaft 7, a driven pulley 9 fastened to the other end of the blade supporting shaft 7, a belt 10 wound around the driving pulley 4 and the driven pulley 9, a center-distance setting means connected between the motor 2 and the saw blade 8, for adjustably setting the center-to-center distance between the motor 2 and the saw blade 8 or between the output shaft 3 of the motor 2 and the blade supporting shaft 7, and a saw-blade height adjusting device being operable to adjust the height of the of the saw blade 8, or the height of the part of the saw blade 8 which comes out from the working table.

As indicated above, the motor 2 is mounted to the main frame 1 by the motor mounting plate 11. Specifically, the motor mounting plate 11 is fastened to the main frame 1, and a motor mount 2a, which is a part of the motor 2, is mounted to the motor mounting plate 11 via motor mounting screws 12. The motor mounting screws 12 are inserted through oblong holes 18 formed in the motor mounting plate 11, and are screwed into corresponding screw holes formed in the motor mount 2a. In the embodiment shown in FIG. 1, there are three motor mounting screws 12 and three oblong holes 18. However, for the purpose of supporting, two motor mounting screws 12 and two corresponding oblong holes 18 are enough, and even more mounting screws and oblong holes are also possible. Meanwhile, in the embodiment shown in FIG. 1, the oblong holes 18 are extended in a horizontal direction, although slanted oblong holes are also possible.

The motor mounting screws 12, after they are screwed into the motor mount 2a, should create no or only a small clamping force between the motor mount 2a and the motor mounting plate 11. As a result, in normal state, the motor mount 2a and therefore the motor 2 can slide along the extending direction of the oblong holes 18 freely or by overcoming a certain low resistance force. That is to say, in normal state, the motor 2 can be forced to move relative to the motor mounting plate 11 along the extending direction of the oblong holes 18.

For this reason, the motor mounting screws 12 may be formed as movable connecting screws. Such kind of screws is generally used in the art. Specifically, a movable connecting screw (also known as hinge-type supporting screws) is used for connecting and supporting one or more plate-like members to another object. The movable connecting screw has a head portion, a threaded portion and a non-threaded portion. The non-threaded portion has a length equal to or slightly larger than the width of the plate-like member or the total width of the plate-like members supported by it, so that the plate-like member(s) supported by the non-threaded portion is (are) movable or slidable with respect to said another object or with respect to each other, but the plate-like members cannot substantially separate from each other or from said another object in the extending direction of the screw.

The clamping force (if exists) of the motor mounting screws 12 should be set properly. Specifically, in order that the motor mount 2a can slide along the oblong holes 18 by overcoming a certain low resistance force, the clamping force of the motor mounting screws 12 should not be too high.

Now the center-distance setting means connected between the motor 2 and the saw blade 8 will be described. The center-distance setting means comprises a slender shaped motor connecting plate 14 and a bent blade connecting plate 15. The motor connecting plate 14 has a through hole formed at its one end and is pivotably mounted onto a shaft sleeve 13 which is fixed to the motor mount 2a and is inserted through the through hole of the motor connecting plate 14. The other end of the motor connecting plate 14 is formed with at least two oblong holes 16 in the extending direction of the motor connecting plate 14, and the end of the blade connecting plate 15 which is proximate to the motor connecting plate 14 is formed with screw holes corresponding to the oblong holes 16. Setting screws 17 are inserted through the oblong holes 16 and are tightly screwed into the screw holes of the blade connecting plate 15, so as to fix the motor connecting plate 14 and the blade connecting plate 15 together. The other end of the blade connecting plate 15 is formed with a through hole, by means of which the blade connecting plate 15 is pivotably mounted onto the blade supporting member 5.

In the embodiment shown in the figures, the oblong holes 16 are provided in the motor connecting plate 14 and the blade connecting plate 15 is formed with screw holes. However, the same effect can be obtained if the oblong holes 16 are provided in the blade connecting plate 15 and the motor connecting plate 14 is formed with screw holes.

In normal state, the motor connecting plate 14 and the blade connecting plate 15 cannot be moved with respect to each other, which means that the distance between the center of the motor 2 and that of the saw blade 8, or the distance between the center of the output shaft 3 and that of the blade supporting shaft 7, is fixed. However, when the belt is loose and needs to be tightened, an operator may unscrew the setting screws 17 to some extent so that the motor connecting plate 14 and the blade connecting plate 15 are able to move with respect to each other in the extending direction of the oblong holes 16. Then, the operator can pull or push the motor connecting plate 14 or the motor 2 in a direction away from the blade connecting plate 15, so that the motor connecting plate 14 is moved away from the blade connecting plate 15 along the oblong holes 16. As a result of which, the distance between the center of the output shaft 3 and that of the blade supporting shaft 7 is increased. Then, the setting screws 17 are screwed in again, so as to fix the motor connecting plate 14 and the blade connecting plate 15 together to form a unit. That is to say, the normal state is re-established, wherein the motor connecting plate 14 is pivotable around the output shaft 3 and the blade connecting plate 15 is pivotable around the blade supporting member 5.

Now the saw-blade height adjusting device will be described. The saw-blade height adjusting device comprises two holding plates, i.e., a left holding plate 19 and a right holding plate 20, which are fixed to the main frame 1 (specifically, fixed to the vertical plate part 1' and the horizontal plate part 1''' respectively), a transverse shaft 21 supported by the left holding plate 19 and the right holding plate 20 and being capable of rotating about a horizontal axis, a handwheel 22 fixed to the outer end of the transverse shaft 21, a bevel gear 23 fixed to the inner end of the transverse shaft 21 and being capable of rotating with the transverse shaft 21 about the same horizontal axis, a bevel gear 24 engaged with the bevel gear 23 and driven by the bevel gear 23 to rotate about a vertical axis, a screw shaft 25 fixed to the bevel gear 24 and being capable of rotating with the bevel gear 24 about the same vertical axis, a nut 26 mounted on and engaged with the screw shaft 25, an attachment member 27 fixed to the nut 26, a channel shaped guide 30 fixed to the attachment member 27 and fixedly supporting the blade supporting member 5, with the guide 30 being formed with upper and lower guiding holes in its upper and lower ends respectively, and vertical guiding rods 28 and 29 fixed to the main frame 1 (specifically, fixed to the horizontal bar 1" and the horizontal plate part 1''') and extending through the upper and lower guiding holes for guiding the guide 30 ascending or descending in the vertical direction.

When the height of the saw blade is to be adjusted, an operator can rotate the handwheel 22. Then the handwheel 22 drives the transverse shaft 21, the bevel gear 23, the bevel gear 24 and the screw shaft 25 to rotate. By the rotation of the screw shaft 25, the nut 26 will move upwards or downwards along the screw shaft 25. The guide 30 ascends or descends along with the nut 26 along the guiding rods 28 and 29. As a result, the blade supporting member 5 and therefore the saw blade 8 are moved together with the guide 30 upwards or downwards. That is to say, the height of the saw blade 8, or the height of the part of the saw blade 8 which comes out from the working table, is adjusted. In this process, as a result of the ascending or descending of the blade supporting member 5, the motor connecting plate 14 and the blade connecting plate 15 pivot around the shaft sleeve 13 and the blade supporting member 5 respectively. Since the motor connecting plate 14 and the blade connecting plate 15 are fixed together as a unit and therefore the distance between the output shaft 3 and the blade supporting shaft 7 is not changed, the motor connecting plate 14 forces the motor 2 to move along the oblong holes 18 with respect to the motor mounting plate 11 to the left or to the right.

When the handwheel 22 is not rotated, the blade supporting member 5 is supported by the guide 30 at a fixed vertical position. That is to say, the vertical position of the blade supporting member 5 or the vertical position of the saw blade 8 is fixed. Meanwhile, the horizontal position of the blade supporting member 5 or the horizontal position of the saw blade 8 is also fixed by the guide 30.

The belt 10 may be composed of a plurality of V-type belts. In this case, the driving pulley 4 and the driven pulley 9 are V-groove pulleys, i.e., they each have a plurality of V-shaped grooves, to match with the belts. By using V-type belts and V-groove pulleys, the driving precision will be increased, and the slippage and shift of the belt 10 will be prevented. Such kind of belt driving mechanism is especially helpful in the frequent adjusting of the of the saw blade.

The left holding plate 19 and the right holding plate 20 may be integrated with the main frame 1, so as to form a unit. In this case, the manufacture and assembly of the table saw will be simplified, and the reliability of the table saw will be increased.

In order to reduce resistance force and increase wear resisting ability so as to increase the life time of the guide 30 and of the guiding rods 28 and 29, the upper and lower guiding holes of the guide 30 may be provided with guide sleeves 31.

By using the blade driving mechanism of the invention, the height of the saw blade, or the cutting-in depth of the workpiece, can be adjusted easily and promptly when desired. The driving mechanism has a simple structure, is convenient to adjust and operate, and has a low manufacturing cost and a high output. The blade driving mechanism of the invention may be used in various table saws.

It will be apparent to those skilled in the art that variations and modifications of the present invention can be made without departing from the scope or spirit of the invention.

What is claimed is:

1. A blade driving mechanism of a table saw, wherein the table saw comprises a main frame and a saw blade mounted to and driven by the blade driving mechanism, the blade driving mechanism comprising:
    an electrical motor mounted to the main frame, with the motor being capable of sliding with respect to the main frame substantially linearly in a horizontal direction;
    a belt driving system transferring the rotation of an output shaft of the motor to the saw blade;
    a center-distance setting means connected between the motor and the saw blade, for adjustably setting the center-to-center distance between the motor and the saw blade; and
    a saw-blade height adjusting device being operable to adjust the height of the saw blade and comprising:
        a transverse shaft being capable of rotating about a horizontal axis;
        a handwheel fixed to the outer end of the transverse shaft for driving the transverse shaft to rotate;
        a vertical screw shaft coupled with the transverse shaft by a set of bevel gears and driven by the transverse shaft to rotate about a vertical axis;
        a nut mounted on and engaged with the screw shaft and being capable of moving vertically along the screw shaft by the rotation of the screw shaft; and
        a guide connected to the nut and supporting the saw blade, the guide being capable of moving vertically with the nut;
    wherein the center-distance setting means comprises a motor connecting plate and a blade connecting plate, wherein the motor connecting plate is pivotably mounted onto a shaft sleeve of the motor at one end and is formed with at least two oblong holes at the other end, the end of the blade connecting plate which is proximate to the motor connecting plate is formed with screw holes corresponding to the oblong holes, the other end of the blade connecting plate is pivotably mounted onto a blade supporting member which is fixed to the guide and supports the saw blade, and setting screws inserted through the oblong holes and tightly screwed into the screw holes of the blade connecting plate, so as to fix the motor connecting plate and the blade connecting plate together.

2. The blade driving mechanism according to claim 1, wherein the belt driving system comprises a driving pulley fastened to the output shaft of the motor, a driven pulley connected to the saw blade for driving the saw blade to rotate, and a belt wound around the driving pulley and the driven pulley.

3. The blade driving mechanism according to claim 2 wherein the saw blade is mounted to a saw blade supporting shaft, and the driven pulley is connected to the saw blade supporting shaft, which is rotatably supported by the blade supporting member via bearings.

4. The blade driving mechanism according to claim 2, wherein the belt is composed of a V-type belt, and the driving pulley and the driven pulley are V-groove pulleys.

5. The blade driving mechanism according to claim 1, wherein the electrical motor is mounted to the main frame via a motor mounting plate which is fastened to the main frame, a motor mount of the motor is mounted to the motor mounting plate via at least two motor mounting screws which are inserted through oblong holes formed horizontally in the motor mounting plate and are screwed into corresponding screw holes formed in the motor mount, and the motor mounting screws, after they are screwed into the motor mount, allow the motor mount and therefore the motor to slide along the horizontal direction freely or by overcoming a certain low resistance force.

6. The blade driving mechanism according to claim 5, wherein the motor mounting screws are movable connecting screws.

7. The blade driving mechanism according to claim 1, wherein the transverse shaft is rotatably supported by a left holding plate and a right holding plate, and the left holding plate and the right holding plate are attached to and integrated with the main frame to form a unit.

8. The blade driving mechanism according to claim 1, wherein the guide is formed with guiding holes, and vertical guiding rods, which are fixed to the main frame, extend through the guiding holes for guiding the guide ascending or descending in the vertical direction.

9. The blade driving mechanism according to claim 8, wherein each of the guiding holes is provided with a guide sleeve.

* * * * *